United States Patent
Griffin et al.

(10) Patent No.: US 11,823,011 B2
(45) Date of Patent: Nov. 21, 2023

(54) ANALYZING EXECUTION OF QUANTUM SERVICES USING QUANTUM COMPUTING DEVICES AND QUANTUM SIMULATORS

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 289 days.

(21) Appl. No.: 17/387,176

(22) Filed: Jul. 28, 2021

(65) Prior Publication Data

US 2023/0035786 A1    Feb. 2, 2023

(51) Int. Cl.
*G06N 10/00* (2022.01)
*G06F 11/34* (2006.01)
*H04L 67/133* (2022.01)

(52) U.S. Cl.
CPC ......... *G06N 10/00* (2019.01); *G06F 11/3495* (2013.01); *H04L 67/133* (2022.05)

(58) Field of Classification Search
CPC ........ G06N 10/00; G06N 10/20; G06N 10/80; G06F 11/3495; H04L 67/133
See application file for complete search history.

(56) References Cited

U.S. PATENT DOCUMENTS

| | | |
|---|---|---|
| 9,660,859 B1 | 5/2017 | Dadashikelayeh et al. |
| 10,817,337 B1 | 10/2020 | Richardson et al. |
| 2020/0074346 A1 | 3/2020 | Griffin et al. |
| 2020/0117764 A1 | 4/2020 | Zuccarelli et al. |
| 2020/0125402 A1 | 4/2020 | Griffin et al. |
| 2020/0174836 A1 | 6/2020 | Gunnels et al. |
| 2022/0414286 A1* | 12/2022 | Griffin ............ G06N 10/80 |

OTHER PUBLICATIONS

Fingerhuth, M. et al., "Open source software in quantum computing," arXiv:1812.09167v1 [quant-ph], Dec. 21, 2018, https://arxiv.org/pdf/1812.09167.pdf, 22 pages.

* cited by examiner

*Primary Examiner* — Stacy Whitmore
(74) *Attorney, Agent, or Firm* — Dority & Manning, P.A.

(57) ABSTRACT

Analyzing execution of quantum services using quantum computing devices and quantum simulators is disclosed. In one example, a classical computing device receives an operating parameter representing an operating condition of a quantum computing device. Upon determining that the operating parameter satisfies an operating environment threshold, the classical computing device initiates execution of a first instance of a quantum service on the quantum computing device. The classical computing device also simulates, using a quantum simulator, the operating condition of the quantum computing device based on the operating parameter, and executes a second instance of the quantum service using the quantum simulator under the simulated operating condition, in parallel with execution of the first instance of the quantum service. The classical computing device obtains and records a first performance characteristic of the quantum computing device and a second performance characteristic of the quantum simulator.

20 Claims, 10 Drawing Sheets

ANALYZING EXECUTION OF QUANTUM SERVICES USING QUANTUM COMPUTING DEVICES AND QUANTUM SIMULATORS

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. Execution of quantum services may also be performed on classical computing devices using quantum simulators. As quantum computing continues to increase in popularity and become more commonplace, an ability to provide a more complete comparison of processing results generated by quantum simulators and quantum computing devices will be desirable.

SUMMARY

The examples disclosed herein implement an analyzer service for analyzing execution of quantum services using quantum computing devices and quantum simulators. The analyzer service receives an operating parameter that indicates an operating condition of a quantum computing device. If the operating parameter satisfies an operating environment threshold, the analyzer service initiates execution of a first instance of a quantum service on a quantum computing device. The analyzer service also executes a second instance of the quantum service using a quantum simulator that simulates the operating condition of the quantum computing device based on the operating parameter. A first performance characteristic of the quantum computing device and a second performance characteristic of the quantum simulator are then obtained and recorded. In this manner, a more informed analysis of quantum service execution results can be performed by comparing the first performance characteristic and the second performance characteristic.

In one example, a method for analyzing execution of quantum services using quantum computing devices and quantum simulators is disclosed. The method comprises receiving, by a classical computing device, an operating parameter from a quantum computing device, wherein the operating parameter represents an operating condition of the quantum computing device. The method further comprises determining that the operating parameter satisfies an operating environment threshold. The method also comprises, responsive to determining that the operating parameter satisfies an operating environment threshold, initiating execution of a first instance of a quantum service on the quantum computing device. The method additionally comprises simulating, by a quantum simulator of the classical computing device, the operating condition of the quantum computing device based on the operating parameter. The method further comprises executing a second instance of the quantum service by the quantum simulator under the simulated operating condition, in parallel with execution of the first instance of the quantum service. The method also comprises obtaining a first performance characteristic of the quantum computing device. The method additionally comprises obtaining a second performance characteristic of the quantum simulator. The method further comprises recording the first performance characteristic and the second performance characteristic.

In another example, a classical computing device is disclosed. The classical computing device comprises a system memory, and a processor device communicatively coupled to the system memory. The processor device is to receive an operating parameter from a quantum computing device, wherein the operating parameter represents an operating condition of the quantum computing device. The processor device is further to determine that the operating parameter satisfies an operating environment threshold. The processor device is also to, responsive to determining that the operating parameter satisfies an operating environment threshold, initiate execution of a first instance of a quantum service on the quantum computing device. The processor device is additionally to simulate, using a quantum simulator, the operating condition of the quantum computing device based on the operating parameter. The processor device is further to execute a second instance of the quantum service using the quantum simulator under the simulated operating condition, in parallel with execution of the first instance of the quantum service. The processor device is also to obtain a first performance characteristic of the quantum computing device. The processor device is additionally to obtain a second performance characteristic of the quantum simulator. The processor device is further to record the first performance characteristic and the second performance characteristic.

In another example, a non-transitory computer-readable medium is disclosed. The non-transitory computer-readable medium stores thereon computer-executable instructions that, when executed, cause one or more processor devices to receive an operating parameter from a quantum computing device, wherein the operating parameter represents an operating condition of the quantum computing device. The computer-executable instructions further cause the one or more processor devices to determine that the operating parameter satisfies an operating environment threshold. The computer-executable instructions also cause the one or more processor devices to, responsive to determining that the operating parameter satisfies an operating environment threshold, initiate execution of a first instance of a quantum service on the quantum computing device. The computer-executable instructions additionally cause the one or more processor devices to simulate, using a quantum simulator, the operating condition of the quantum computing device based on the operating parameter. The computer-executable instructions further cause the one or more processor devices to execute a second instance of the quantum service using the quantum simulator under the simulated operating condition, in parallel with execution of the first instance of the quantum service. The computer-executable instructions also cause the one or more processor devices to obtain a first performance characteristic of the quantum computing device. The computer-executable instructions additionally cause the one or more processor devices to obtain a second performance characteristic of the quantum simulator. The computer-executable instructions further cause the one or more processor devices to record the first performance characteristic and the second performance characteristic.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first instance" and "second instance," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices. Because qubits generally require very specific environmental conditions for operation, development of quantum services is generally not performed on quantum computing devices, but rather is performed using development software and quantum simulators that execute on classical (i.e., non-quantum) computing devices. For example, a developer may execute development software within a container provided by an application container framework to write and test a quantum service definition that defines a quantum service.

To ensure that a quantum simulator accurately reproduces the behavior of a quantum computing device, the results of executing the quantum service using the quantum simulator may be compared with the results of executing the same quantum service using a quantum computing device. However, it may be difficult to determine whether differences in results obtained from the quantum simulator and the quantum computing device are due to, e.g., configuration issues in the quantum simulator, transient operating conditions in the quantum computing device, and/or other issues. Accordingly, an ability to provide a more complete comparison of processing results generated by quantum simulators and quantum computing devices will be desirable.

In this regard, the examples disclosed herein implement a classical computing device for analyzing execution of quantum services using quantum computing devices and quantum simulators. As used herein, the term "quantum simulator" refers to functionality provided by a classical computing device for employing a quantum service definition to simulate the execution of a corresponding quantum service. The term "quantum service" and derivatives thereof refer to a process that executes on a quantum computing device, and that accesses one or more qubits to provide a desired functionality. In exemplary operation, a processor device of the classical computing device (e.g., by executing an analyzer service) receives an operating parameter from a quantum computing device. The operating parameter represents an operating condition of the quantum computing device, and may include, as non-limiting examples, a count of available qubits of the quantum computing device, a processor load of the quantum computing device, an amount of available memory of the quantum computing device, or a count of executing processes of the quantum computing device. In some examples, the operating parameter may be obtained from a quantum task manager of the quantum computing device, or obtained via a hardware application programming interface (API) provided by the quantum computing device.

The classical computing device next determines that the operating parameter satisfies an operating environment threshold. By ensuring that the operating parameter satisfies the operating environment threshold, the classical computing device can reduce the likelihood that the operating environment of the quantum computing device will introduce performance issues when subsequently executing a quantum service. In response to determining that the operating parameter satisfies the operating environment threshold, the classical computing device initiates execution of a first instance of a quantum service on the quantum computing device (e.g., by accessing functionality of the quantum task manager of the quantum computing device). The classical computing device also uses a quantum simulator to simulate the operating condition of the quantum computing device based on the operating parameter, and executes a second instance of the quantum service using the quantum simulator under the simulated operating condition. Execution of the first instance of the quantum service and the second instance of the quantum service takes place in parallel.

The classical computing device next obtains a first performance characteristic of the quantum computing device and a second performance characteristic of the quantum simulator. The first performance characteristic and the second performance characteristic each may comprise an attribute of the quantum computing device and the quantum simulator, respectively, during execution of the first instance of the quantum service and the second instance of the quantum service. Thus, the first performance characteristic and the second performance characteristic may comprise a generated output, an execution time, a measure of resource consumption, an indication of a number of concurrently executing processes, a rate of readout errors, a rate of gate errors, qubit longitudinal relaxation (T1) times, and/or qubit transverse (T2) relaxation times, as non-limiting examples. The classical computing device then records the first performance characteristic and the second performance characteristic (e.g., using a persistent data store).

In some examples, the first performance characteristic and the second performance characteristic each may be obtained during execution of the first instance of the quantum service and the second instance of the quantum service, respectively, and/or may be obtained upon completion of execution of the first instance of the quantum service and the second instance of the quantum service. The first performance characteristic and the second performance characteristic may be obtained by accessing logs generated by the quantum computing device and the quantum simulator, respectively, and/or may be obtained via other functionality provided by the quantum computing device and the quantum simulator. Some examples may provide that the analyzer service of the classical computing device synchronizes the obtaining of the first performance characteristic and the second performance characteristic to ensure that the first performance characteristic and the second performance characteristic correspond in time.

The first performance characteristic and the second performance characteristic obtained and recorded by the classical computing device may subsequently be used to better optimize the quantum simulator and/or the quantum service. For instance, in some examples, the classical computing device may modify an attribute of the quantum simulator during execution of the second instance of the quantum service based on a comparison of the first performance characteristic and the second performance characteristic. In this manner, the quantum simulator may be adjusted in realtime to better match the performance of the quantum computing device. Similarly, the classical computing device according to some examples may modify an attribute of the quantum simulator for a subsequent execution of the quantum service based on a comparison of the first performance characteristic and the second performance characteristic. Some examples may provide that the classical computing device may use a comparison of the first performance characteristic and the second performance characteristic to identify a code portion of a quantum service definition that defines the quantum service as a candidate for optimization. In such examples, the quantum service itself may be refined and optimized for better execution on the quantum computing device.

Figure 1:
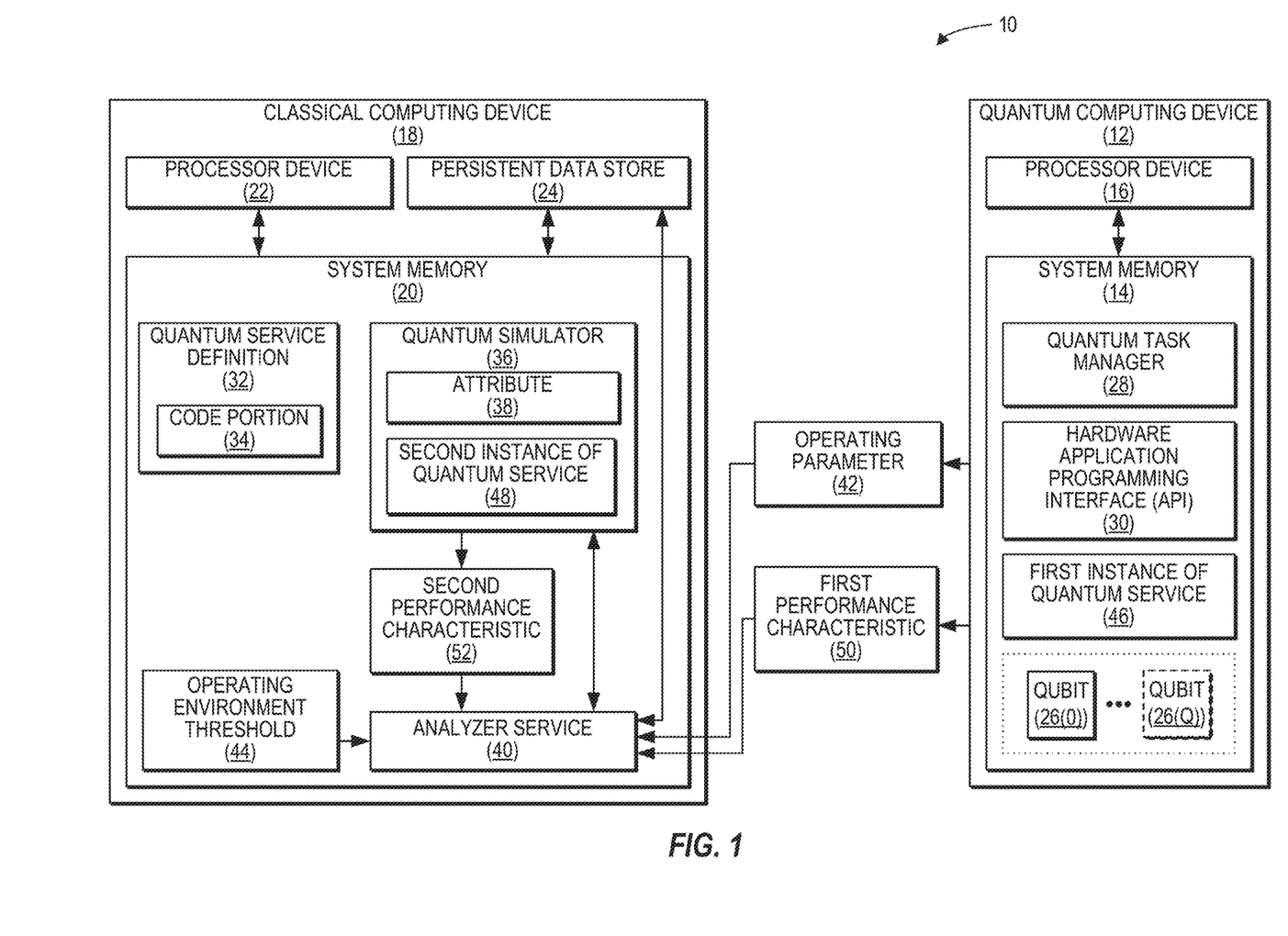
FIG. 1 is a block diagram of a computing system in which examples may be practiced.

FIG. 1 is a block diagram of a computing system 10 according to one example. The computing system 10 includes a quantum computing device 12 that comprises a system memory 14 and a processor device 16. The computing system 10 of FIG. 1 further includes a classical computing device 18 that comprises a system memory 20 and a processor device 22, and that further includes a persistent data store 24 (e.g., a hard drive or solid-state drive (SSD), as non-limiting examples). The quantum computing device 12 and the classical computing device 18 are all communicatively coupled via a classical communications link (not shown), which may comprise a private network or a public network such as the internet. It is to be understood that the computing system 10, according to some examples, may include other quantum computing devices and/or classical computing devices that are not illustrated in FIG. 1. Additionally, the quantum computing device 12 and/or the classical computing device 18 in some examples may include constituent elements in addition to those illustrated in FIG. 1.

The quantum computing device 12 in the example of FIG. 1 operates in quantum environments, but is capable of operating using classical computing principles or quantum computing principles. When using quantum computing principles, the quantum computing device 12 performs computations that utilize quantum-mechanical phenomena, such as superposition and/or entanglement states. The quantum computing device 12 may operate under certain environmental conditions, such as at or near zero degrees (0°) Kelvin. When using classical computing principles, the quantum computing device 12 utilizes binary digits that have a value of either zero (0) or one (1).

In the example of FIG. 1, the quantum computing device 12 implements a set of one or more qubits 26(0)-26(Q) for use by quantum services executed by the quantum computing device 12. To maintain information for the qubit(s) 26(0)-26(Q), the quantum computing device 12 may include a qubit registry (not shown), which comprises a plurality of qubit registry entries each corresponding to a qubit such as the one or more qubits 26(0)-26(Q). The qubit registry maintains and provides access to data relating to the qubits implemented by the quantum computing device 12, such as a count of the total number of qubits implemented by the quantum computing device 12 and a count of the number of available qubits that are currently available for allocation, as non-limiting examples. Each of the qubit registry entries of the qubit registry also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

The quantum computing device 12 of FIG. 1 executes one or more quantum services, each of which comprises a process that employs qubits such as the one or more qubits 26(0)-26(Q) to provide desired functionality. Execution of quantum services is facilitated by a quantum task manager 28, which handles operations for creating, monitoring, and terminating quantum services. The quantum task manager 28 may provide an interface (not shown) through which other services or tasks may request specific information regarding the qubits 26(0)-26(Q), any executing quantum services, and/or the quantum computing device 12. Additionally, information regarding the status and functionality of the quantum computing device 12 and the elements thereof may be made accessible to other processes via a hardware application programming interface (API) 30.

Because qubits such as the qubits 26(0)-26(Q) generally require very specific environmental conditions for operation, development and testing of quantum services generally is not performed on the quantum computing device 12, but rather is performed on a separate device such as the classical computing device 18. In the example of FIG. 1, the classical computing device 18 provides a quantum service definition 32 that defines and implements a corresponding quantum service. The quantum service definition 32 may comprise a Quantum Assembly (QASM) file, as a non-limiting example, and includes a code portion 34 that comprises quantum instructions that implement the corresponding quantum service. It is to be understood that, although only a single code portion 34 is shown in FIG. 1, the quantum service definition 32 may be subdivided into multiple code portions 34, each of which may correspond to, e.g., a subroutine, a loop, or a function, as non-limiting examples.

The quantum service definition 32 may then be provided to a quantum simulator 36 such as the Qiskit quantum computing framework, which is an open-source framework that provides tools for creating and manipulating quantum programs and services and simulating execution of the quantum programs and services on classical computing devices. Within the quantum simulator 36, the quantum service definition 32 may be used to execute the corresponding quantum service. The quantum simulator 36 comprises an attribute 38 that may be adjusted to modify the operation of the quantum simulator 36. In some examples, the attribute 38 may specify a configuration or a characteristic such as, e.g., available simulated qubits, available computational resources, and the like. Although FIG. 1 illustrates a single attribute 38, it is to be understood that the quantum simulator may comprise multiple attributes 38.

The results of executing a quantum service using the quantum simulator 36 may be compared with the results of executing the same quantum service using the quantum computing device 12 to determine how well the quantum simulator 36 reproduces the behavior of the quantum computing device 12. However, in some circumstances, it may be difficult to determine whether differences in results obtained from the quantum simulator 36 and the quantum computing device 12 are due to, e.g., configuration issues in the quantum simulator 36, transient operating conditions in the quantum computing device 12, and/or other issues. Accordingly, an ability to provide a more complete comparison of processing results generated by the quantum simulator 36 and the quantum computing device 12 will be desirable.

In this regard, the classical computing device 18 implements an analyzer service 40 for analyzing execution of quantum services using quantum computing devices and quantum simulators. In exemplary operation, the analyzer service 40 executed by the processor device 22 of the classical computing device 18 receives an operating parameter 42 from the quantum computing device 12. The operating parameter 42 represents an operating condition of the quantum computing device 12, such as a count of available qubits 26(0)-26(Q) of the quantum computing device 12, a processor load of the quantum computing device 12, an amount of available memory of the quantum computing device 12, or a count of executing processes of the quantum computing device 12. The operating parameter 42 in some examples may be obtained from the quantum task manager 28 of the quantum computing device 12, and/or may be obtained via the hardware API 30 provided by the quantum computing device 12. It is to be understood that, while FIG. 1 illustrates only a single operating parameter 42, some examples may provide that the analyzer service 40 receives multiple operating parameters 42 corresponding to multiple operating conditions of the quantum computing device 12. In such examples, the multiple operating parameters may be received at a same point in time, or may be received over a time interval.

The analyzer service 40 next determines that the operating parameter 42 satisfies an operating environment threshold 44. The operating environment threshold 44 corresponds to the operating parameter 42 and specifies a maximum and/or minimum acceptable value or range of values for the operating parameter 42. By determining that the operating parameter 42 satisfies the operating environment threshold 44, the analyzer service 40 can reduce the likelihood that the operating environment of the quantum computing device 12 will introduce performance issues when subsequently executing a quantum service.

Upon determining that the operating parameter 42 satisfies the operating environment threshold 44, the analyzer service 40 initiates execution of a first instance 46 of a quantum service on the quantum computing device 12. In some examples, initiating execution of the first instance 46 of the quantum service may comprise providing the quantum service definition 32 to the quantum computing device 12, and then accessing functionality of the quantum task manager 28 of the quantum computing device 12 to cause the first instance 46 of the quantum service to execute. The analyzer service 40 also uses the quantum simulator 36 to simulate the operating condition of the quantum computing device 12 based on the operating parameter 42. This may be accomplished in some examples by adjusting the attribute 38 of the quantum simulator 36 based on the operating parameter 42 to more closely reproduce the operating environment of the quantum computing device 12. The analyzer service 40 then executes a second instance 48 of the quantum service using the quantum simulator 36 under the simulated operating condition (e.g., by providing the quantum service definition 32 to the quantum simulator 36). The analyzer service 40 ensures that the execution of the first instance 46 of the quantum service and the second instance 48 of the quantum service takes place in parallel.

The analyzer service 40 next obtains a first performance characteristic 50 of the quantum computing device 12, as well as a second performance characteristic 52 of the quantum simulator 36. The first performance characteristic 50 and the second performance characteristic 52 each may comprise an attribute of the quantum computing device 12 and the quantum simulator 36, respectively, during execution of the first instance 46 of the quantum service and the second instance 48 of the quantum service. Thus, the first performance characteristic 50 and the second performance characteristic 52 may comprise a generated output, an execution time, a measure of resource consumption, an indication of a number of concurrently executing processes, a rate of readout errors, a rate of gate errors, qubit longitudinal relaxation (T1) times, and/or qubit transverse (T2) relaxation times, as non-limiting examples. The analyzer service 40 then records the first performance characteristic 50 and the second performance characteristic 52 (e.g., by writing the first performance characteristic 50 and the second performance characteristic 52 to the persistent data store 24 of the classical computing device 18).

In some examples, the first performance characteristic 50 and the second performance characteristic 52 each may be obtained during execution of the first instance 46 of the quantum service and the second instance 48 of the quantum service, respectively, and/or may be obtained upon completion of execution of the first instance 46 of the quantum service and the second instance 48 of the quantum service. The analyzer service 40 according to some examples may obtain the first performance characteristic 50 and the second performance characteristic 52 by accessing logs (not shown) generated by the quantum computing device 12 and the quantum simulator 36, respectively, and/or via other functionality provided by the quantum computing device 12 and the quantum simulator 36. Some examples may provide that the analyzer service 40 of the classical computing device 18 synchronizes the obtaining of the first performance characteristic 50 and the second performance characteristic 52 to ensure that the first performance characteristic 50 and the second performance characteristic 52 correspond in time.

The first performance characteristic 50 and the second performance characteristic 52 that are obtained and recorded by the classical computing device 18 may subsequently be used to better optimize the quantum simulator 36 and/or the quantum service defined by the quantum service definition 32. For instance, a comparison of the first performance characteristic 50 and the second performance characteristic 52 that indicates better performance by the quantum simulator 36 than the quantum computing device 12 at a given point in time may indicate that the operating conditions of the quantum computing device 12 may have degraded at that point in time. Conversely, a comparison of the first performance characteristic 50 and the second performance characteristic 52 that indicates better performance by the quantum computing device 12 than the quantum simulator 36 may indicate that the quantum simulator 36 is not accurately reproducing the functionality of the quantum computing device 12. In the latter scenario, the attribute 38 of the quantum simulator 36 may be modified by the analyzer service 40 during execution of the second instance 48 of the quantum service based on a comparison of the first performance characteristic 50 and the second performance characteristic 52. In this manner, the quantum simulator 36 may be adjusted in realtime to better match the performance of the quantum computing device 12. Similarly, the analyzer service 40 according to some examples may modify the attribute 38 of the quantum simulator 36 for a subsequent execution of the quantum service based on a comparison of the first performance characteristic 50 and the second performance characteristic 52.

Some examples may provide that the classical computing device 18 may use a comparison of the first performance characteristic 50 and the second performance characteristic 52 to identify the code portion 34 of the quantum service definition 32 as a candidate for optimization. For instance, the comparison may indicate a disparity between the first performance characteristic 50 and the second performance characteristic 52 during execution of the code portion 34, indicating that optimization of the code portion 34 could resolve the disparity.

It is to be understood that, because the analyzer service 40 is a component of the classical computing device 18, functionality implemented by the analyzer service 40 may be attributed to the classical computing device 18 or to the computing system 10 generally. Moreover, in examples where the analyzer service 40 comprises software instructions that program the processor device 22 to carry out functionality discussed herein, functionality implemented by the analyzer service 40 may be attributed herein to the processor device 22. It is to be further understood that while, for purposes of illustration only, the analyzer service 40 is depicted as a single component, the functionality implemented by the analyzer service 40 may be implemented in any number of components, and the examples discussed herein are not limited to any particular number of components.

Figure 2A:
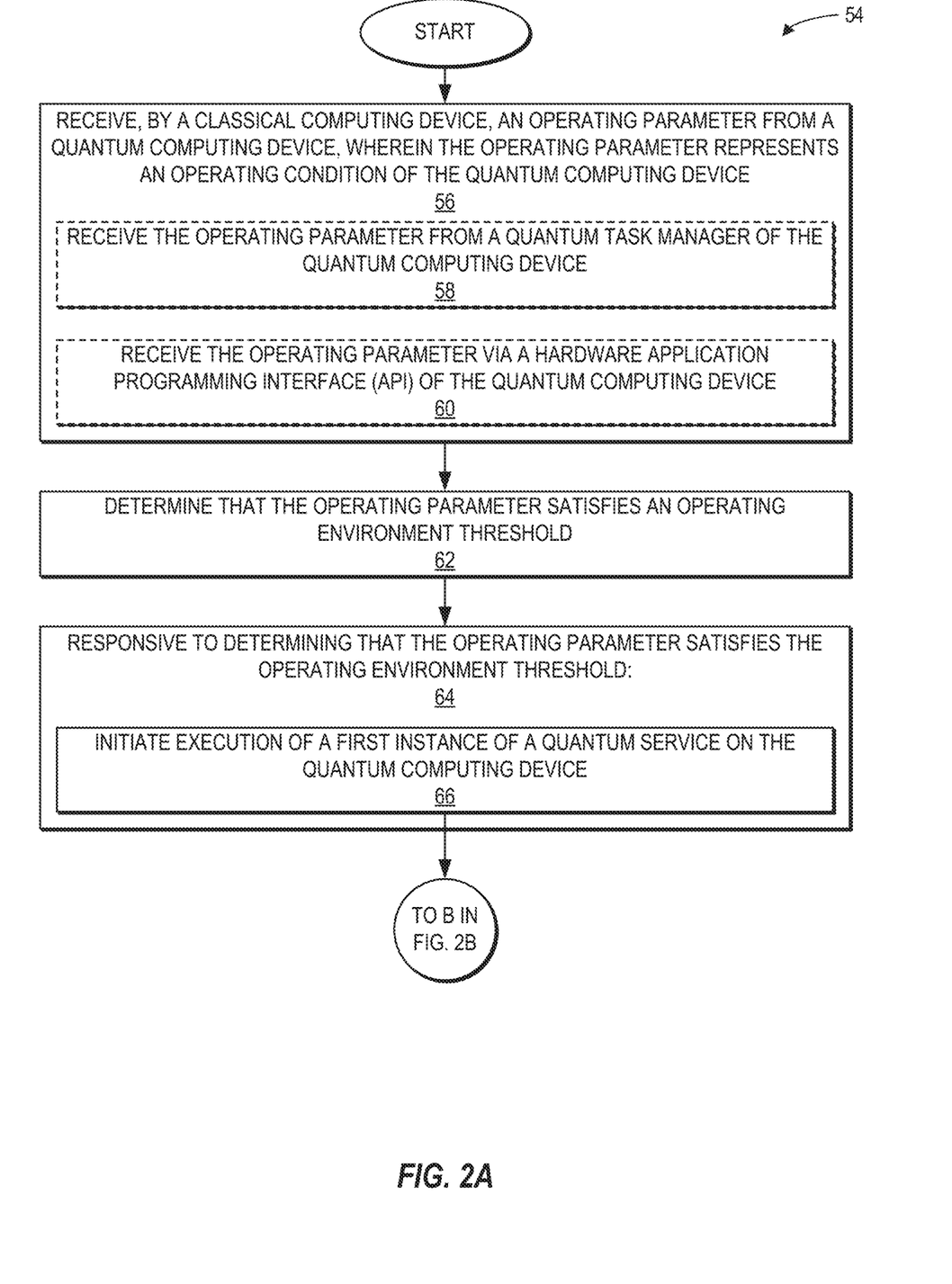
FIGS. 2A-2D are flowcharts illustrating operations performed by the computing system of FIG. 1 for analyzing execution of quantum services using quantum computing devices and quantum simulators, according to one example.

To illustrate exemplary operations performed by the computing system 10 of FIG. 1 for analyzing execution of quantum services using quantum computing devices and quantum simulators according to one example, FIGS. 2A-2D provide a flowchart 54. Elements of FIG. 1 are referenced in describing FIGS. 2A-2D for the sake of clarity. In FIG. 2A, operations begin with a processor device of a classical computing device (e.g., the processor device 22 of the classical computing device 18 of FIG. 1) receiving an operating parameter, such as the operating parameter 42 of FIG. 1, from a quantum computing device (e.g., the quantum computing device 12 of FIG. 1), wherein the operating parameter 42 represents an operating condition of the quantum computing device 12 (block 56). In some examples, the operations of block 56 for receiving the operating parameter 42 may comprise receiving the operating parameter 42 from a quantum task manager (such as the quantum task manager 28 of FIG. 1) of the quantum computing device 12 (block 58). Some examples may provide that the operations of block 56 for receiving the operating parameter 42 may comprise receiving the operating parameter 42 via a hardware API (e.g., the hardware API 30 of FIG. 1) of the quantum computing device 12 (block 60).

The processor device 22 next determines that the operating parameter 42 satisfies an operating environment threshold, such as the operating environment threshold 44 of FIG. 1 (block 62). In response to determining that the operating parameter 42 satisfies the operating environment threshold 44, the processor device 22 performs a series of operations (block 64). The processor device 22 initiates execution of a first instance of a quantum service, such as the first instance 46 of FIG. 1, on the quantum computing device 12 (block 66). Processing then continues at block 68 of FIG. 2B.

Figure 2B:
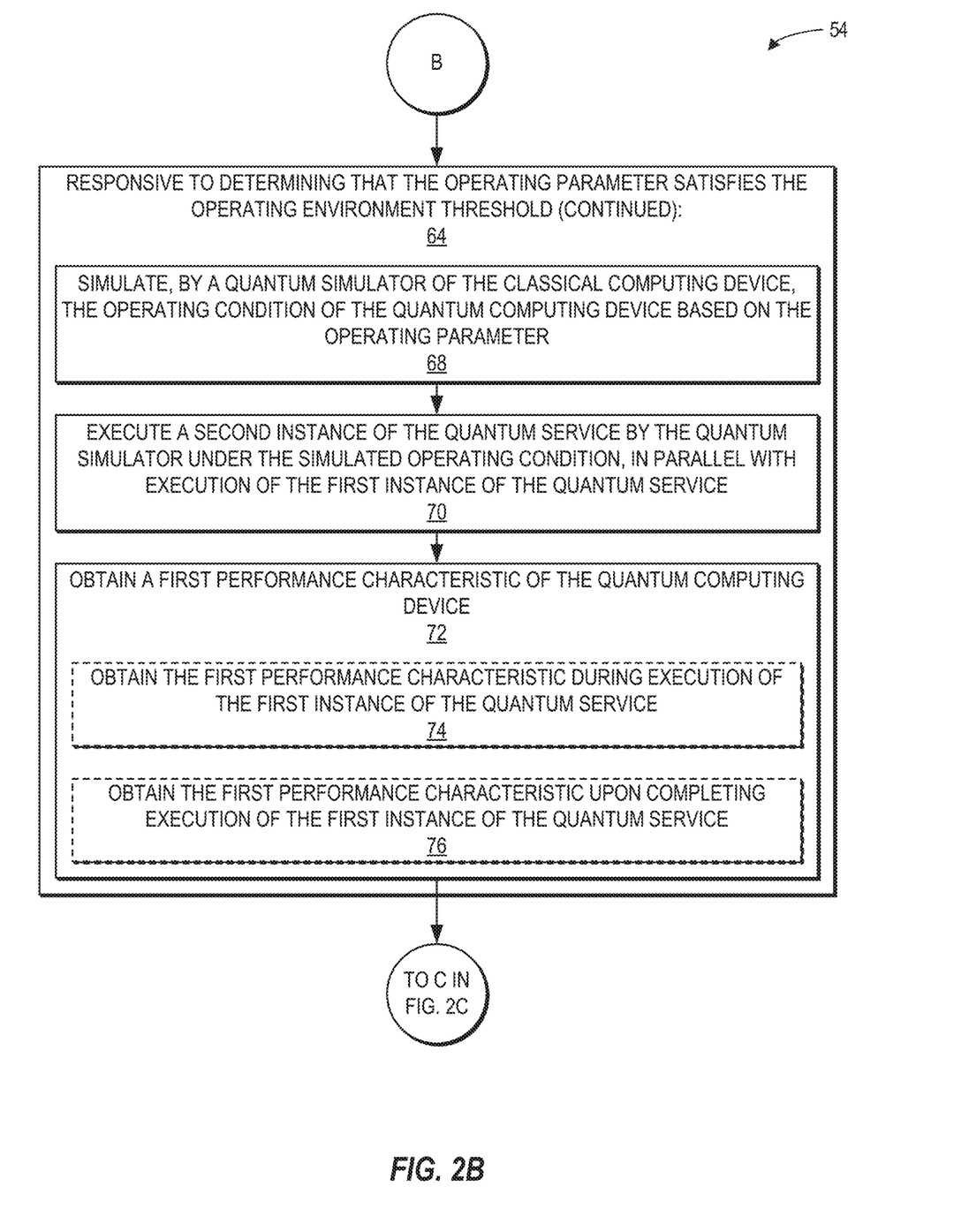

Referring now to FIG. 2B, the operations of block 64 of FIG. 1 performed by the processor device 22 in response to determining that the operating parameter 42 satisfies the operating environment threshold 44 continue. The processor device 22 simulates, using a quantum simulator (e.g., the quantum simulator 36 of FIG. 1) of the classical computing device 18, the operating condition of the quantum computing device 12 based on the operating parameter 42 (block 68). The processor device 22 then executes a second instance of the quantum service (such as the second instance 48 of FIG. 1) by the quantum simulator 36 under the simulated operating condition, in parallel with execution of the first instance 46 of the quantum service (block 70).

The processor device 22 subsequently obtains a first performance characteristic (e.g., the first performance characteristic 50 of FIG. 1) of the quantum computing device 12 (block 72). Some examples may provide that the operations of block 72 for obtaining the first performance characteristic 50 comprise obtaining the first performance characteristic 50 during execution of the first instance 46 of the quantum service (block 74). In some examples, the operations of block 72 for obtaining the first performance characteristic 50 may comprise obtaining the first performance characteristic 50 upon completing execution of the first instance 46 of the quantum service (block 76). Processing then continues at block 78 of FIG. 2C.

Figure 2C:
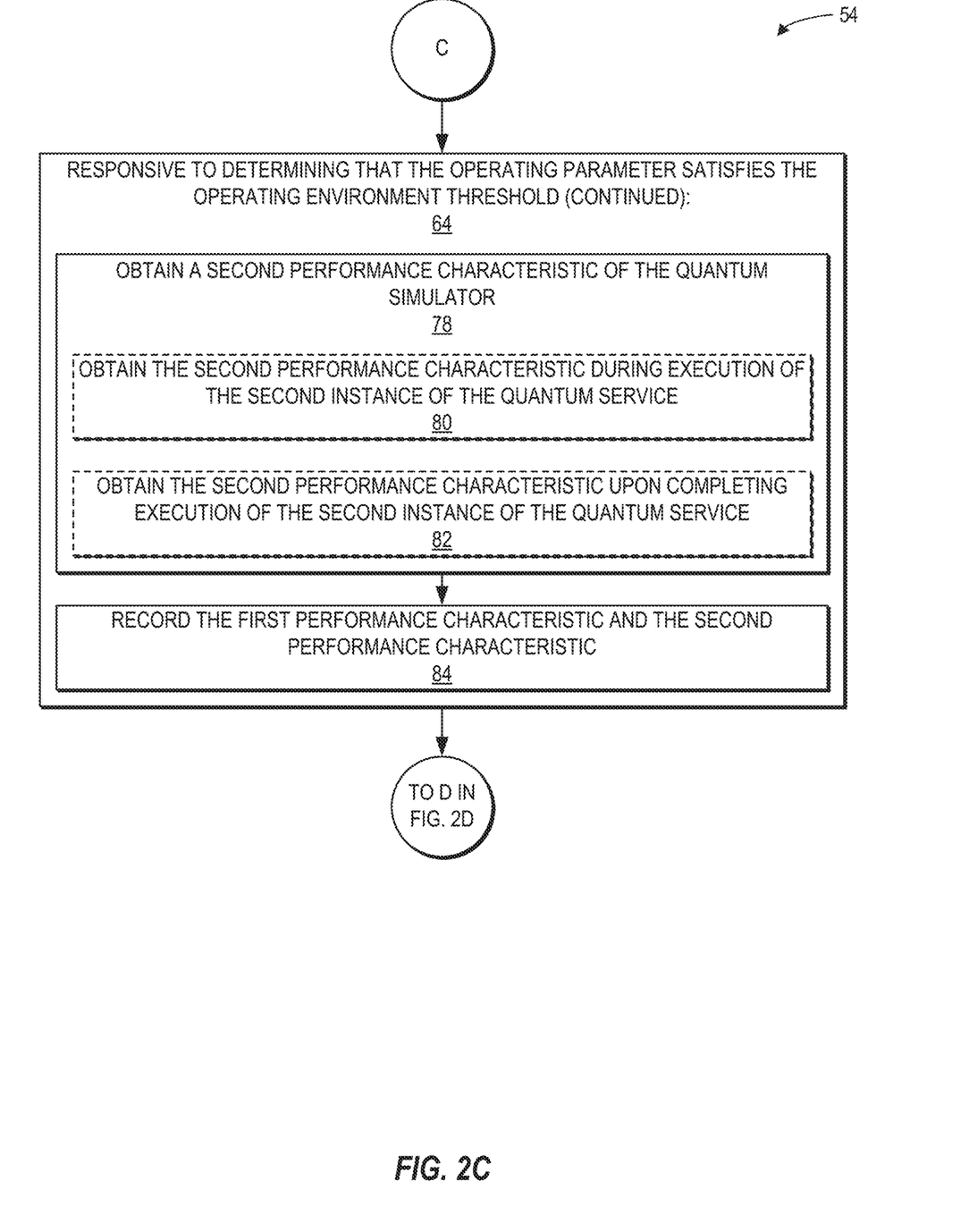

Turning now to FIG. 2C, the operations of block 64 of FIG. 1 performed by the processor device 22 in response to determining that the operating parameter 42 satisfies the operating environment threshold 44 continue. The processor device 22 obtains a second performance characteristic (e.g., the second performance characteristic 52 of FIG. 1) of the quantum simulator 36 (block 78). According to some examples, the operations of block 78 for obtaining the second performance characteristic 52 may comprise obtaining the second performance characteristic 52 during execution of the second instance 48 of the quantum service (block 80). Some examples may provide that the operations of block 78 for obtaining the second performance characteristic 52 comprise obtaining the second performance characteristic 52 upon completing execution of the second instance 48 of the quantum service (block 82). The processor device 22 then records the first performance characteristic 50 and the second performance characteristic 52 (block 84). Processing in some examples may continue at block 86 of FIG. 2D.

Figure 2D:
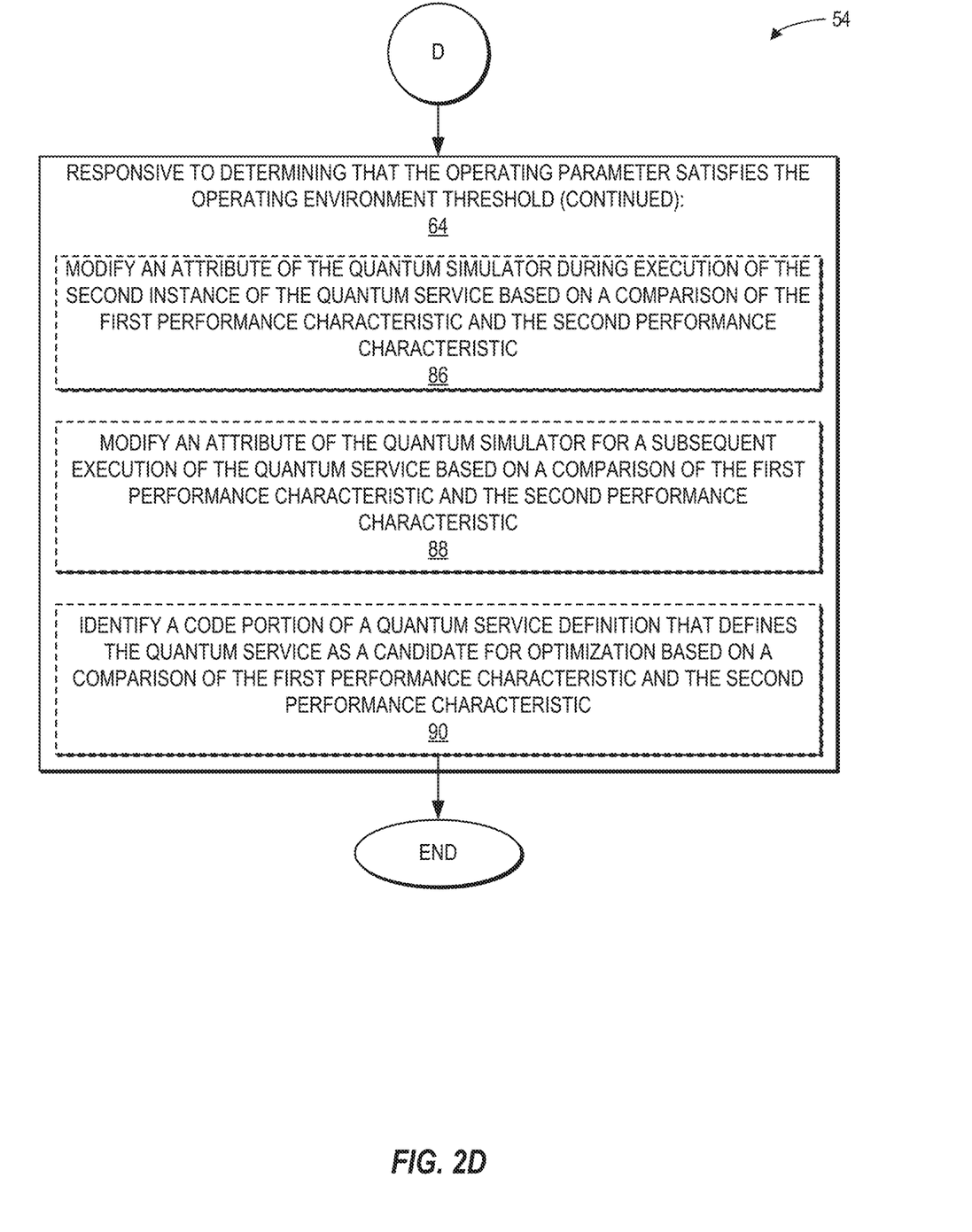

Referring now to FIG. 2D, the operations of block 64 of FIG. 1 performed by the processor device 22 in response to determining that the operating parameter 42 satisfies the operating environment threshold 44 continue. In some examples, the processor device 22 may modify an attribute of the quantum simulator 36 (e.g., the attribute 38 of FIG. 1) during execution of the second instance 48 of the quantum service based on a comparison of the first performance characteristic 50 and the second performance characteristic 52 (block 86). The processor device 22 according to some examples may modify the attribute 38 of the quantum simulator 36 for a subsequent execution of the quantum service based on a comparison of the first performance characteristic 50 and the second performance characteristic 52 (block 88). Some examples may provide that the processor device 22 may identify a code portion of a quantum service definition that defines the quantum service (such as the code portion 34 of a quantum service definition 32 of FIG. 1) as a candidate for optimization based on a comparison of the first performance characteristic 50 and the second performance characteristic 52 (block 90).

Figure 3:
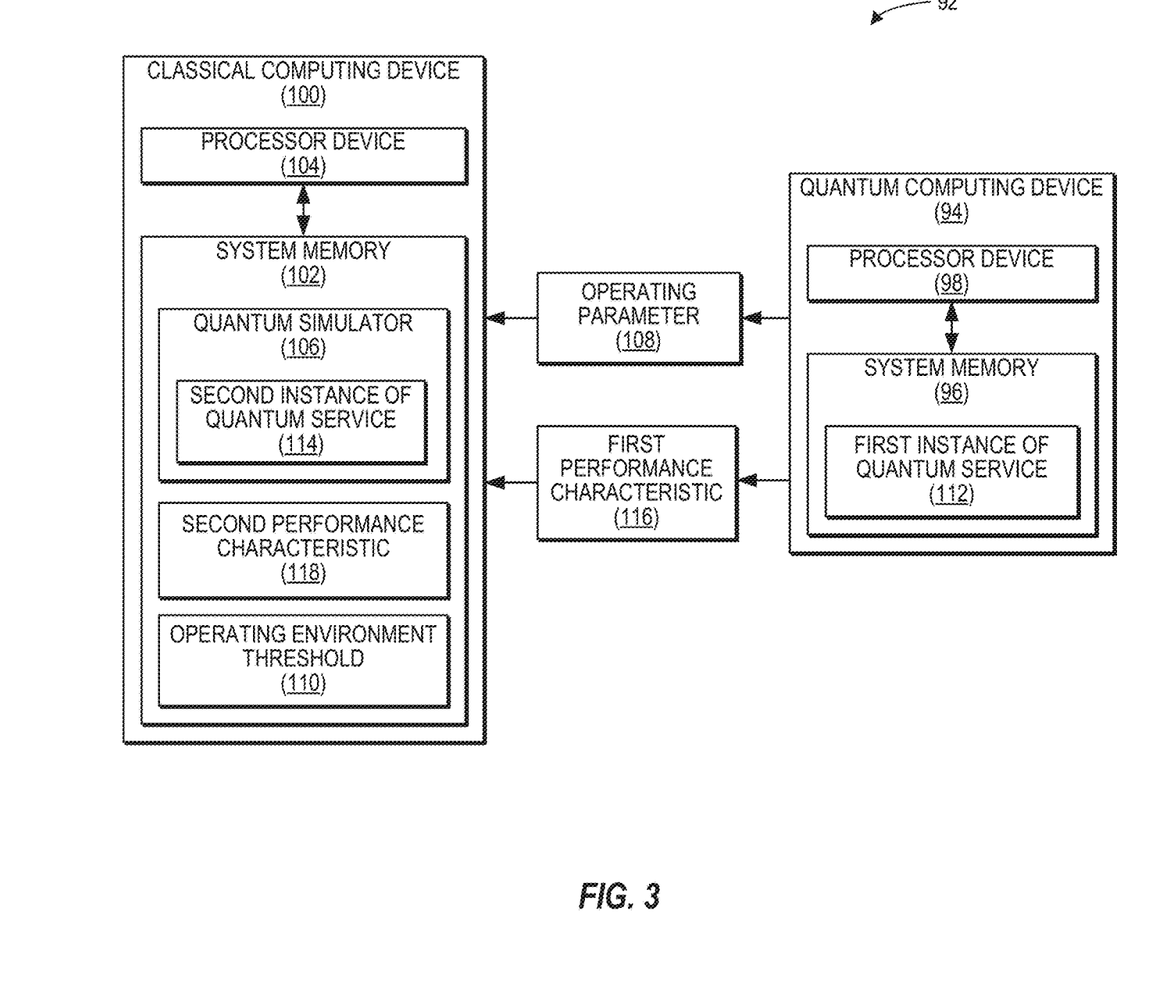
FIG. 3 is a simpler block diagram of the computing system of FIG. 1 for analyzing execution of quantum services using quantum computing devices and quantum simulators, according to one example.

FIG. 3 is a simpler block diagram of the computing system 10 of FIG. 1 for analyzing execution of quantum services using quantum computing devices and quantum simulators, according to one example. In the example of FIG. 3, a computing system 92 includes a quantum computing device 94 that comprises a system memory 96 and a processor device 98. The computing system 92 of FIG. 3 further includes a classical computing device 100 that comprises a system memory 102 and a processor device 104. The quantum computing device 94 of FIG. 1 executes one or more quantum services, each of which comprises a process that employs qubits to provide desired functionality. The classical computing device 100 includes a quantum simulator 106 for simulating execution of quantum programs and services.

In exemplary operation, the processor device 104 of the classical computing device 100 receives an operating parameter 108 from the quantum computing device 94, where the operating parameter 108 represents an operating condition of the quantum computing device 94. The processor device 104 next determines that the operating parameter 108 satisfies an operating environment threshold 110. Upon determining that the operating parameter 108 satisfies the operating environment threshold 110, the processor device 104 initiates execution of a first instance of a quantum service 112 on the quantum computing device 94. The processor device 104 also uses the quantum simulator 106 to simulate the operating condition of the quantum computing device 94 based on the operating parameter 108. The processor device 104 then executes a second instance of the quantum service 114 using the quantum simulator 106 under the simulated operating condition, in parallel with the execution of the first instance of the quantum service 112. The processor device 104 obtains a first performance characteristic 116 of the quantum computing device 94, and obtains a second performance characteristic 118 of the quantum simulator 106. The processor device 104 then records the first performance characteristic 116 and the second performance characteristic 118.

Figure 4A:
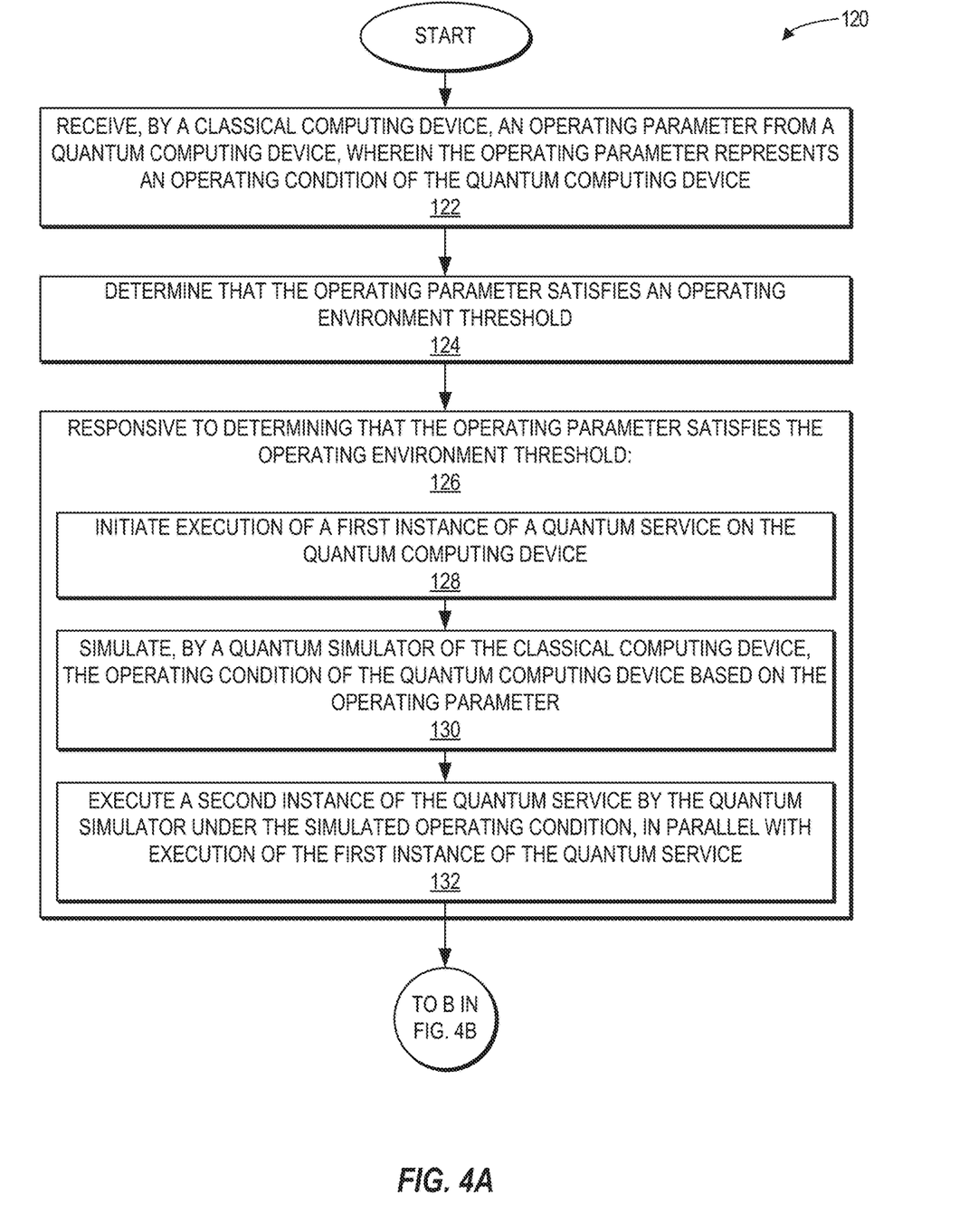
FIGS. 4A and 4B are flowcharts of a simplified method for analyzing execution of quantum services using quantum computing devices and quantum simulators by the classical computing device of FIG. 3, according to one example.
Figure 4B:
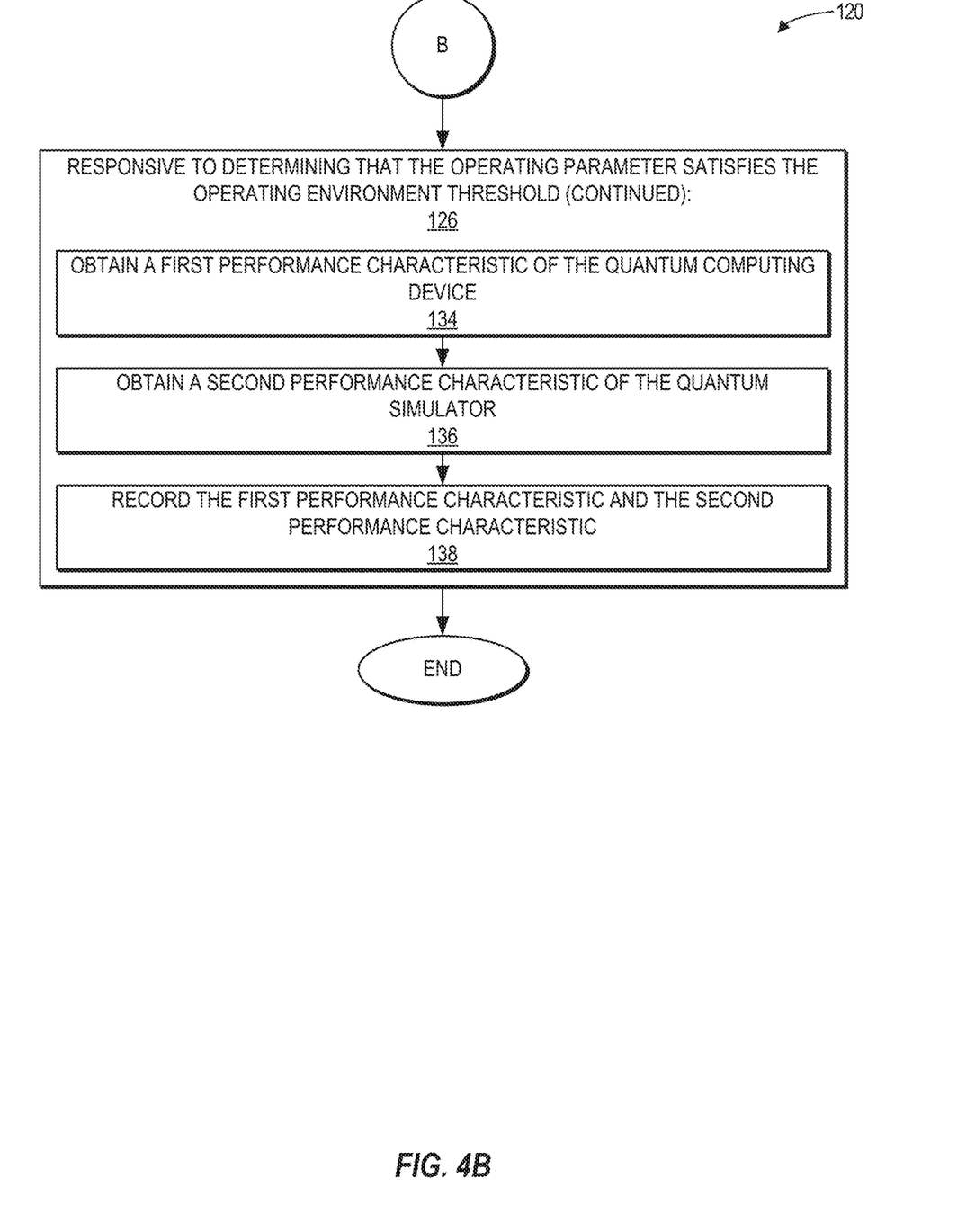

FIGS. 4A and 4B provide a flowchart 120 of a simplified method for analyzing execution of quantum services using quantum computing devices and quantum simulators by the classical computing device 100 of FIG. 3, according to one example. For the sake of clarity, elements of FIG. 3 are referenced in describing FIG. 4. Operations in FIG. 4 begin with the processor device 104 of the classical computing device 100 receiving the operating parameter 108 from the quantum computing device 94, wherein the operating parameter 108 represents an operating condition of the quantum computing device 94 (block 122). The processor device 104 determines that the operating parameter 108 satisfies the operating environment threshold 110 (block 124). In response to determining that the operating parameter 108 satisfies the operating environment threshold 110, the processor device 104 performs a series of operations (block 126). The processor device 104 initiates execution of the first instance of a quantum service 112 on the quantum computing device 94 (block 128). The processor device 104 also simulates, using the quantum simulator 106 of the classical computing device 100, the operating condition of the quantum computing device 94 based on the operating parameter 108 (block 130). The processor device 104 then executes the second instance of the quantum service 114 by the quantum simulator 106 under the simulated operating condition, in parallel with execution of the first instance of the quantum service 112 (block 132). Processing then continues at block 134 of FIG. 4B.

Referring now to FIG. 4B, the operations of block 126 performed by the processor device 104 in response to determining that the operating parameter 108 satisfies the operating environment threshold 110 continue. The processor device 104 obtains the first performance characteristic 116 of the quantum computing device 94 (block 134). The processor device 104 also obtains the second performance characteristic 118 of the quantum simulator 106 (block 136). The processor device 104 then records the first performance characteristic 116 and the second performance characteristic 118 (block 138).

Figure 5:
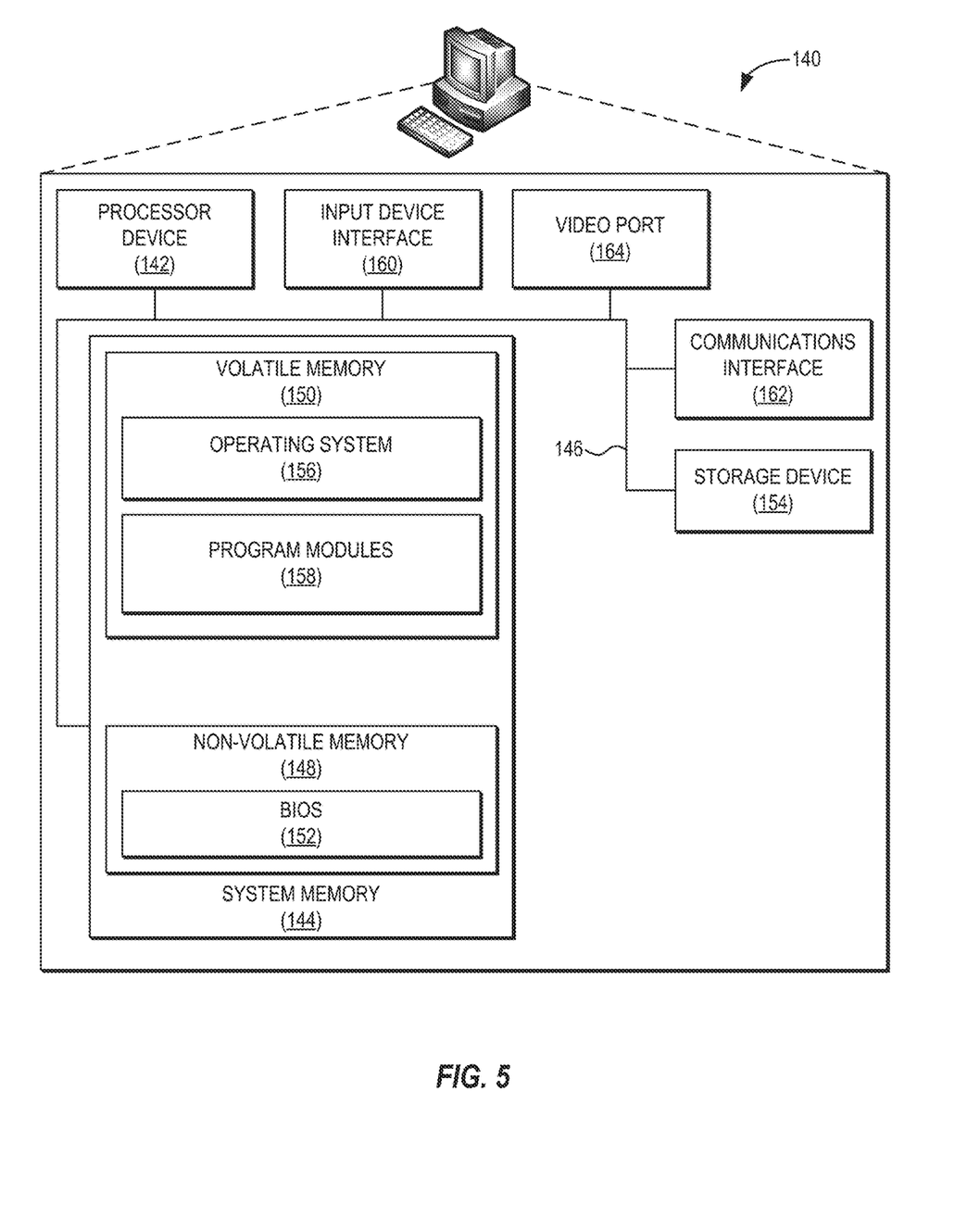
FIG. 5 is a block diagram of a classical computing device suitable for implementing examples, according to one example.

FIG. 5 is a block diagram of a processor-based computing device 140 ("computing device 140" or "classical computing device 140"), such as the classical computing device 18 of FIG. 1, suitable for implementing examples according to one example. The computing device 140 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 140 includes a processor device 142, a system memory 144, and a system bus 146. The system bus 146 provides an interface for system components including, but not limited to, the system memory 144 and the processor device 142. The processor device 142 can be any commercially available or proprietary processor.

The system bus 146 may be any of several types of bus structures that may further interconnect to a memory bus (with or without a memory controller), a peripheral bus, and/or a local bus using any of a variety of commercially available bus architectures. The system memory 144 may include non-volatile memory 148 (e.g., read-only memory (ROM), erasable programmable ROM (EPROM), electrically EPROM (EEPROM), etc.), and volatile memory 150 (e.g., RAM). A basic input/output system (BIOS) 152 may be stored in the non-volatile memory 148 and can include the basic routines that help to transfer information among elements within the computing device 140. The volatile memory 150 may also include a high-speed RAM, such as static RAM, for caching data.

The computing device 140 may further include or be coupled to a non-transitory computer-readable storage medium such as a storage device 154, which may comprise, for example, an internal or external hard disk drive (HDD) (e.g., enhanced integrated drive electronics (EIDE) or serial advanced technology attachment (SATA)), for storage, flash memory, or the like. The storage device 154 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 154 and in the volatile memory 150, including an operating system 156 and one or more program modules 158 which may implement the functionality described herein in whole or in part. It is to be appreciated that the examples can be implemented with various commercially available operating systems 156 or combinations of operating systems 156. All or a portion of the examples may be implemented as a computer program product stored on a transitory or non-transitory computer-usable or computer-readable storage medium, such as the storage device 154, which includes complex programming instructions, such as complex computer-readable program code, to cause the processor device 142 to carry out the steps described herein. Thus, the computer-readable program code can comprise software instructions for implementing the functionality of the examples described herein when executed on the processor device 142. The processor device 142 may serve as a controller, or control system, for the computing device 140 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 142 through an input device interface 160 that is coupled to the system bus 146 but can be connected by other interfaces, such as a parallel port, an Institute of Electrical and Electronic Engineers (IEEE) 1394 serial port, a Universal Serial Bus (USB) port, an IR interface, and the like.

The computing device 140 may also include a communications interface 162 suitable for communicating with a network as appropriate or desired. The computing device 140 may also include a video port 164 to interface with a display device to provide information to a user.

Figure 6:
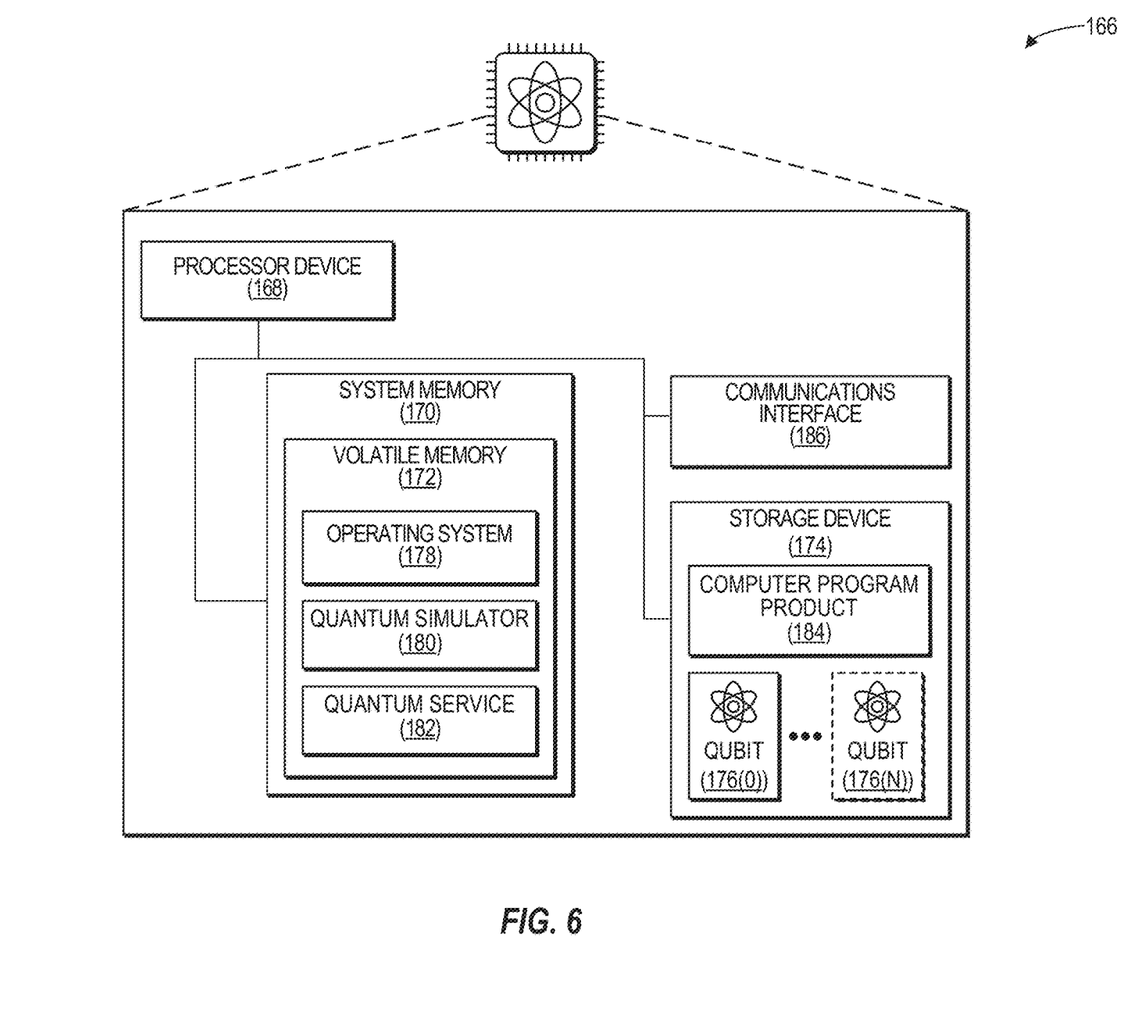
FIG. 6 is a block diagram of a quantum computing device suitable for implementing examples, according to one example.

FIG. 6 is a block diagram of a quantum computing device 166, such as the quantum computing device 12 of FIG. 1, suitable for implementing examples according to one example. The quantum computing device 166 may comprise any suitable quantum computing device or devices. The quantum computing device 166 can operate using classical computing principles or quantum computing principles. When using quantum computing principles, the quantum computing device 166 performs computations that utilize quantum-mechanical phenomena, such as superposition and entanglement. The quantum computing device 166 may operate under certain environmental conditions, such as at or near zero degrees (0°) Kelvin. When using classical computing principles, the quantum computing device 166 utilizes binary digits that have a value of either zero (0) or one (1).

The quantum computing device 166 includes a processor device 168 and a system memory 170. The processor device 168 can be any commercially available or proprietary processor suitable for operating in a quantum environment. The system memory 170 may include volatile memory 172 (e.g., random-access memory (RAM)). The quantum computing device 166 may further include or be coupled to a non-transitory computer-readable medium such as a storage device 174. The storage device 174 and other drives associated with computer-readable media and computer-usable media may provide non-volatile storage of data, data structures, computer-executable instructions, and the like. The storage device may also provide functionality for storing one or more qubits 176(0)-176(N).

A number of modules can be stored in the storage device 174 and in the volatile memory 172, including an operating system 178 and one or more modules, such as a quantum simulator 180 and a quantum service 182. All or a portion of the examples may be implemented as a computer program product 184 stored on a transitory or non-transitory computer-usable or computer-readable medium, such as the storage device 174, which includes complex programming instructions, such as complex computer-readable program code, to cause the processor device 168 to carry out the steps described herein. Thus, the computer-readable program code can comprise computer-executable instructions for implementing the functionality of the examples described herein when executed on the processor device 168.

An operator may also be able to enter one or more configuration commands through a keyboard (not illustrated), a pointing device such as a mouse (not illustrated), or a touch-sensitive surface such as a display device (not illustrated). The quantum computing device 166 may also include a communications interface 186 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
   receiving, by a classical computing device, an operating parameter from a quantum computing device, wherein the operating parameter represents an operating condition of the quantum computing device;
   determining that the operating parameter satisfies an operating environment threshold; and
   responsive to determining that the operating parameter satisfies an operating environment threshold:
   initiating execution of a first instance of a quantum service on the quantum computing device;
   simulating, by a quantum simulator of the classical computing device, the operating condition of the quantum computing device based on the operating parameter;
   executing a second instance of the quantum service by the quantum simulator under the simulated operating condition, in parallel with execution of the first instance of the quantum service;
   obtaining a first performance characteristic of the quantum computing device;

obtaining a second performance characteristic of the quantum simulator; and recording the first performance characteristic and the second performance characteristic.

2. The method of claim 1, wherein receiving the operating parameter comprises receiving the operating parameter from a quantum task manager of the quantum computing device.

3. The method of claim 1, wherein receiving the operating parameter comprises receiving the operating parameter via a hardware application programming interface (API) of the quantum computing device.

4. The method of claim 1, wherein the operating parameter comprises a count of available qubits of the quantum computing device, a processor load of the quantum computing device, an amount of available memory of the quantum computing device, or a count of executing processes of the quantum computing device.

5. The method of claim 1, wherein:
obtaining the first performance characteristic comprises obtaining the first performance characteristic during execution of the first instance of the quantum service; and
obtaining the second performance characteristic comprises obtaining the second performance characteristic during execution of the second instance of the quantum service.

6. The method of claim 5, further comprising modifying an attribute of the quantum simulator during execution of the second instance of the quantum service based on a comparison of the first performance characteristic and the second performance characteristic.

7. The method of claim 1, wherein:
obtaining the first performance characteristic comprises obtaining the first performance characteristic upon completing execution of the first instance of the quantum service; and
obtaining the second performance characteristic comprises obtaining the second performance characteristic upon completing execution of the second instance of the quantum service.

8. The method of claim 1, further comprising modifying an attribute of the quantum simulator for a subsequent execution of the quantum service based on a comparison of the first performance characteristic and the second performance characteristic.

9. The method of claim 1, further comprising identifying a code portion of a quantum service definition that defines the quantum service as a candidate for optimization based on a comparison of the first performance characteristic and the second performance characteristic.

10. A classical computing device, comprising:
a system memory; and
a processor device communicatively coupled to the system memory, the processor device to:
receive an operating parameter from a quantum computing device, wherein the operating parameter represents an operating condition of the quantum computing device;
determine that the operating parameter satisfies an operating environment threshold; and
responsive to determining that the operating parameter satisfies an operating environment threshold:
initiate execution of a first instance of a quantum service on the quantum computing device;
simulate, using a quantum simulator, the operating condition of the quantum computing device based on the operating parameter;
execute a second instance of the quantum service using the quantum simulator under the simulated operating condition, in parallel with execution of the first instance of the quantum service;
obtain a first performance characteristic of the quantum computing device;
obtain a second performance characteristic of the quantum simulator; and
record the first performance characteristic and the second performance characteristic.

11. The classical computing device of claim 10, wherein to receive the operating parameter is to receive the operating parameter from a quantum task manager of the quantum computing device.

12. The classical computing device of claim 10, wherein to receive the operating parameter is to receive the operating parameter via a hardware application programming interface (API) of the quantum computing device.

13. The classical computing device of claim 10, wherein the operating parameter comprises a count of available qubits of the quantum computing device, a processor load of the quantum computing device, an amount of available memory of the quantum computing device, or a count of executing processes of the quantum computing device.

14. The classical computing device of claim 10, wherein:
to obtain the first performance characteristic is to obtain the first performance characteristic during execution of the first instance of the quantum service; and
to obtain the second performance characteristic is to obtain the second performance characteristic during execution of the second instance of the quantum service.

15. The classical computing device of claim 14, wherein the processor device is further to modify an attribute of the quantum simulator during execution of the second instance of the quantum service based on a comparison of the first performance characteristic and the second performance characteristic.

16. The classical computing device of claim 10, wherein:
to obtain the first performance characteristic is to obtain the first performance characteristic upon completing execution of the first instance of the quantum service; and
to obtain the second performance characteristic is to obtain the second performance characteristic upon completing execution of the second instance of the quantum service.

17. The classical computing device of claim 10, wherein the processor device is further to modify an attribute of the quantum simulator for a subsequent execution of the quantum service based on a comparison of the first performance characteristic and the second performance characteristic.

18. The classical computing device of claim 10, wherein the processor device is further to identify a code portion of a quantum service definition that defines the quantum service as a candidate for optimization based on a comparison of the first performance characteristic and the second performance characteristic.

19. A non-transitory computer-readable medium having stored thereon computer-executable instructions that, when executed, cause one or more processor devices to:
receive an operating parameter from a quantum computing device, wherein the operating parameter represents an operating condition of the quantum computing device;
determine that the operating parameter satisfies an operating environment threshold; and responsive to determining that the operating parameter satisfies an operating environment threshold:
  initiate execution of a first instance of a quantum service on the quantum computing device;
  simulate, using a quantum simulator, the operating condition of the quantum computing device based on the operating parameter;
  execute a second instance of the quantum service using the quantum simulator under the simulated operating condition, in parallel with execution of the first instance of the quantum service;
  obtain a first performance characteristic of the quantum computing device;
  obtain a second performance characteristic of the quantum simulator; and
  record the first performance characteristic and the second performance characteristic.

20. The computer-readable medium of claim 19, wherein the operating parameter comprises a count of available qubits of the quantum computing device, a processor load of the quantum computing device, an amount of available memory of the quantum computing device, or a count of executing processes of the quantum computing device.

* * * * *